US006985628B2

(12) United States Patent
Fan (10) Patent No.: US 6,985,628 B2
(45) Date of Patent: *Jan. 10, 2006

(54) IMAGE TYPE CLASSIFICATION USING EDGE FEATURES

(75) Inventor: Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 598 days.

This patent is subject to a terminal disclaimer.

(21) Appl. No.: 10/040,693

(22) Filed: Jan. 7, 2002

(65) Prior Publication Data

US 2003/0128396 A1 Jul. 10, 2003

(51) Int. Cl.
G06K 9/00 (2006.01)

(52) U.S. Cl. .................. 382/224; 382/165; 382/170

(58) Field of Classification Search ............... 382/162, 382/164, 165, 168–171, 181, 173, 155–159, 382/176, 224, 199, 195, 203, 108, 281; 706/15–16, 706/20, 52, 25; 358/296, 462, 1.9, 1.2, 448, 358/453, 464, 530, 537–538, 515, 500; 345/589–593
See application file for complete search history.

(56) References Cited

U.S. PATENT DOCUMENTS

| | | | | |
|---|---|---|---|---|
| 4,685,143 A | * | 8/1987 | Choate ..................... | 382/170 |
| 5,063,604 A | * | 11/1991 | Weiman ................... | 382/170 |
| 5,101,440 A | | 3/1992 | Watanabe et al. ......... | 382/168 |
| 5,264,946 A | | 11/1993 | Takakura et al. | |
| 5,309,228 A | | 5/1994 | Nakamura ................ | 358/500 |
| 5,311,336 A | | 5/1994 | Kurita et al. | |
| 5,416,890 A | | 5/1995 | Beretta .................... | 345/590 |
| 5,629,989 A | | 5/1997 | Osada ..................... | 382/281 |
| 5,640,492 A | | 6/1997 | Cortes et al. ............ | 706/20.25 |
| 5,767,978 A | | 6/1998 | Revankar et al. ......... | 358/500 |
| 5,778,156 A | | 7/1998 | Schweid et al. ........... | 706/52 |
| 5,867,593 A | * | 2/1999 | Fukuda et al. ............ | 382/176 |
| 5,917,963 A | | 6/1999 | Miyake .................... | 382/300 |
| 6,151,410 A | | 11/2000 | Kuwata et al. | |
| 6,351,558 B1 | | 2/2002 | Kuwata .................... | 382/68 |
| 6,430,222 B1 | | 8/2002 | Okada | |
| 6,647,131 B1 | | 11/2003 | Bradski .................... | 382/107 |
| 6,766,053 B2 | * | 7/2004 | Fan et al. ................. | 382/170 |
| 6,771,813 B1 | | 8/2004 | Katsuyama | |
| 6,888,962 B1 | | 5/2005 | Sonoda et al. | |
| 2001/0052971 A1 | | 12/2001 | Tsuchiya et al. ........... | 355/77 |
| 2002/0031268 A1 | | 3/2002 | Prabhakar et al. | |
| 2002/0067857 A1 | * | 6/2002 | Hartmann et al. ......... | 382/224 |

(Continued)

FOREIGN PATENT DOCUMENTS

JP 11055540 * 2/1999

(Continued)

OTHER PUBLICATIONS

Schettini et al., Colo Image Classification Using Tree Classifier, The Seventh Imaging Conference: Color Science, Systems an Applications, 269-272.*

(Continued)

Primary Examiner—Joseph Mancus
Assistant Examiner—Ishrat Sherali
(74) Attorney, Agent, or Firm—Fay, Sharpe, Fagan, Minnich & McKee, LLP (57) ABSTRACT

A method and system for classifying images between natural pictures and synthetic graphics is provided. In embodiments of the invention, a picture/graphic classification method and system implements edge features for image classification of natural pictures and synthetic graphics. In another embodiment of the invention, a picture/graphic combination classification method and system using edge features, color discreteness features, and SGLD texture features is used to classify images between natural picture and synthetic graphic classes.

20 Claims, 9 Drawing Sheets

U.S. PATENT DOCUMENTS

| | | | |
|---|---|---|---|
| 2002/0131495 A1 | 9/2002 | Prakash et al. | 375/240.08 |
| 2002/0146173 A1 | 10/2002 | Herley | 382/199 |
| 2003/0063803 A1 | 4/2003 | Lin et al. | |

FOREIGN PATENT DOCUMENTS

| | | | |
|---|---|---|---|
| JP | 11055540 A | | 2/1999 |
| JP | 11066301 | * | 3/1999 |
| JP | 11066301 A | | 3/1999 |

OTHER PUBLICATIONS

Shafrenko et al., Histogram Based Segmentation in a Perceptually Uniform Color Space, IEEE 1057-7149/98, 1354-1358.*

Arrowsmith et al., Hybrid Neural Network System for Texture Analysis, 7th Int. Conf. on Image Processing and Its Applications, vol. 1, Jul. 13, 1999, pp. 339-343.

Athitsos et al., Distinguishing Photographs and Graphics on the World Wide Web, Proc. IEEE Workshop on Content-Based Access of Image and Video Libraries, Jun. 20, 1997, pp. 10-17.

Berry et al., A Comparative Study of Matrix Measures for Maximum Likelihood Texture Classification, IEEE Trans. On Systems, Man and Cybernetics, vol. 21, No. 1, Jan. 1991, pp. 252-261.

Lee et al, Texture Image Segmentation Using Structural Artificial Neural Network, SPIE vol. 3185, pp. 58-65.

Mogi, A Hybrid Compression Method based on Region Segmentation for Synthetic and Natural Compound Images, IEEE 0-7803-5467-2, pp. 777-781.

* cited by examiner

IMAGE TYPE CLASSIFICATION USING EDGE FEATURES

BACKGROUND OF THE INVENTION

The invention relates to image processing. It finds particular application in conjunction with classification of images between natural pictures and synthetic graphics, and will be described with particular reference thereto. However, it is to be appreciated that the invention is also amenable to other like applications.

During the past several decades, products and services such as TVs, video monitors, photography, motion pictures, copying devices, magazines, brochures, newspapers, etc. have steadily evolved from monochrome to color With the increasing use of color products and services, there is a growing demand for "brighter" and more "colorful" colors in several applications. Due to this growing demand, display and printing of color imagery that is visually pleasing has become a very important topic. In a typical color copier application, the goal is to render the scanned document in such a way that it is most pleasing to the user Natural pictures differ from synthetic graphics in many aspects, both in terms of visual perception and image statistics. Synthetic graphics are featured with smooth regions separated by sharp edges. On the contrary, natural pictures are often noisier and the region boundaries are less prominent. In processing scanned images, it is sometime beneficial to distinguish images from different origins (e.g., synthetic graphics or natural pictures), however, the origin or "type" information about a scanned image is usually unavailable. The "type" information is extracted from the scanned image. This "type" information is then used in further processing of the images. High-level image classification can be achieved by analysis of low-level image attributes geared for the particular classes. Coloring schemes (e.g., gamut-mapping or filtering algorithms) are tailored for specific types of images to obtain quality reproduction. Once an image has been identified as a synthetic graphic image, further identification of image characteristics can be used to fine-tune the coloring schemes for more appealing reproductions The most prominent characteristics of a synthetic graphic image include patches or areas of the image with uniform color and areas with uniformly changing colors. These areas of uniformly changing color are called sweeps.

Picture/graphic classifiers have been developed to differentiate between a natural picture image and a synthetic graphic image by analyzing low-level image statistics. For example, U.S. Pat. No. 5,767,978 to Revankar et al. discloses an adaptable image segmentation system for differentially rendering black and white and/or color images using a plurality of imaging techniques. An image is segmented according to classes of regions that may be rendered according to the same imaging techniques Image regions may be rendered according to a three-class system (such as traditional text, graphic, and picture systems), or according to more than three image classes. In addition, two image classes may be required to render high quality draft or final output images. The image characteristics that may be rendered differently from class to class may include half toning, colorization and other image attributes.

Synthetic graphics are typically generated using a limited number of colors, usually containing a few areas of uniform colors On the other hand, natural pictures are more noisy, containing smoothly varying colors. A picture/graphic classifier can analyze the colors to distinguish between natural picture images and synthetic graphic images.

Synthetic graphic images contain several areas of uniform color, lines drawings, text, and have very sharp, prominent, long edges. On the other hand, natural pictures are very noisy and contain short broken edges. A picture/graphic classifier can analyze statistics based on edges to distinguish between natural picture images and synthetic graphic images.

Classifiers that can be used to solve a certain classification problem include statistical, structural, neural networks, fuzzy logic, and machine learning classifiers. Several of these classifiers are available in public domain and commercial packages. However, no single classifier seems to be highly successful in dealing with complex real world problems. Each classifier has its own weaknesses and strengths.

The invention contemplates new and improved methods for classifying images that overcome the above-referenced problems and others

SUMMARY OF THE INVENTION

A method and system for classifying images between natural pictures and synthetic graphics is provided. In embodiments of the invention, a picture/graphic classification method and system implements edge features for image classification of natural pictures and synthetic graphics. In another embodiment of the invention, a picture/graphic combination classification method and system using edge features, color discreteness features, and SGLD texture features is used to classify images between natural picture and synthetic graphic classes.

BRIEF DESCRIPTION OF THE DRAWINGS

The invention may take form in various components and arrangements of components, and in various steps and arrangements of steps The drawings are for purposes of illustrating embodiments of the invention and are not to be construed as limiting the invention.

DETAILED DESCRIPTION OF THE INVENTION

Spatial gray-level dependence (SGLD) techniques for image analysis are well known. SGLD feature extraction creates a 2-D histogram that measures first and second-order statistics of an image. These features are captured in SGLD matrices. This was originally proposed for texture analysis of multi-level images Additionally, since texture features distinguish natural pictures from synthetic graphics, SGLD techniques can be applied to picture/graphic classification of images A picture/graphic classifier can be created with algorithms that analyze the texture features captured in SGLD matrices Using the SGLD texture features, the classifier works to determine whether a scanned image is a natural picture or synthetic graphic Furthermore, in color images, the luminance component typically contains enough information to determine the origin of the image. Therefore, an SGLD matrix that captures the luminance component of an image and a picture/graphic classifier using the luminance component from the matrix in a classification algorithm can determine whether the image is a natural picture or synthetic graphic.

Figure 1:
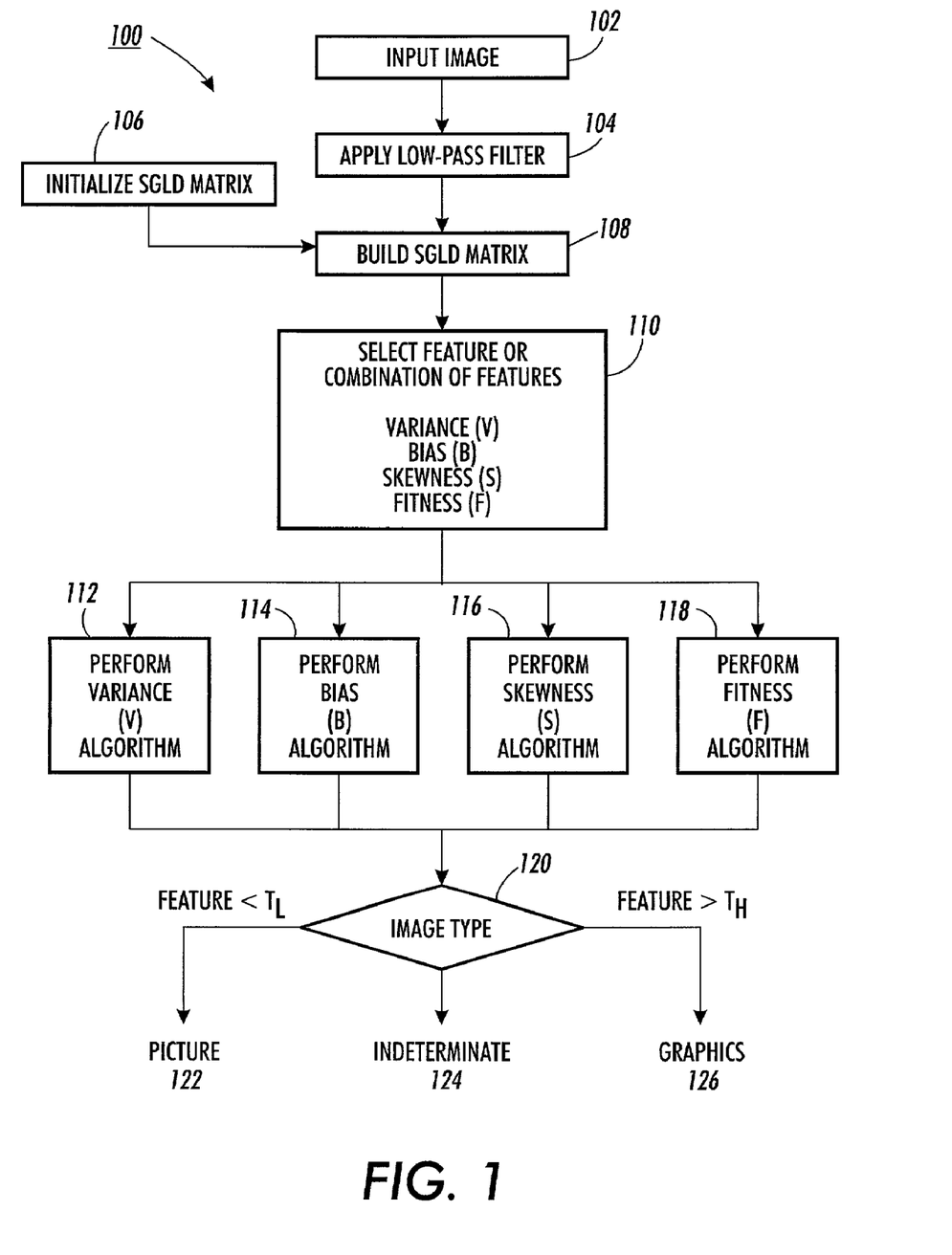
FIG. 1 is a flowchart of an image classification process using SGLD texture features in an embodiment of the invention.

With reference to FIG. 1, a flowchart of an image classification process 100 using SGLD texture features in an embodiment of the invention is shown. Generally, the classification process filters an input image to smooth out halftones, builds an SGLD matrix from the smoothed image, extracts texture features from the matrix, and performs an algorithm to determine whether the image is a natural picture or synthetic graphic based on one or more of the texture features.

More specifically, the process 100 begins with an input image 102 The image is processed using a low-pass filter 104 (e.g., a W×W averaging filter) to smooth the luminance component and reduce any halftone noise The SGLD matrix is basically a GL×GL 2-D histogram, where GL is the number of gray levels (e.g, 256) The SGLD matrix is generated by first performing an initialization (e.g., set to zero) 106. Next, the SGLD matrix is built from the smoothed image 108. The SGLD matrix is a 2-D histogram corresponding to certain characteristics of the pixels in the input image For each pixel (m,n) in the smoothed image, a neighboring value is calculated using the following logic and equations.

if $|x(m,n+d)-x(m,n)|>|x(m+d,n)-x(m,n)|$ then $y(m,n)=x(m,n+d)$, otherwise $y(m,n)=x(m+d,n)$, (1), where x(m,n) is the smoothed pixel value at (m,n), (m,n+d) and (m+d,n) are vertical and horizontal neighbors, respectively, and d is a fixed integer (typically one or two)

Figure 2:
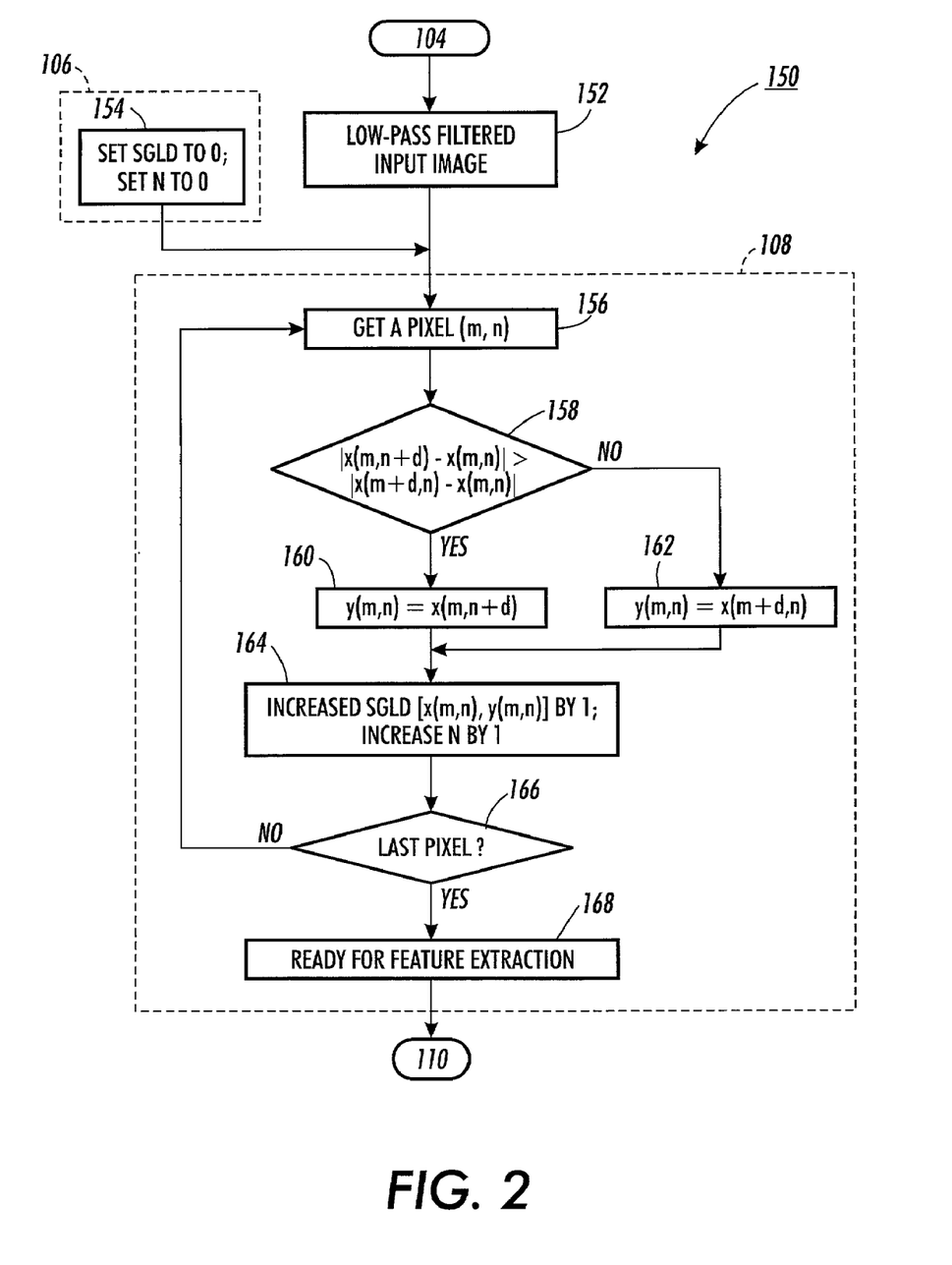
FIG. 2 is a more detailed flowchart of the SGLD matrix initialization and construction process portion of the flowchart in FIG. 1.

With reference to FIG. 2, a flowchart of an embodiment of the SGLD matrix initialization and construction process is shown. The initialization step 106 sets the SGLD matrix to zero and sets a pixel counter (N) to zero 154. The SGLD matrix is constructed from a low-pass filtered image 152 provided by the low-pass filter 104 Construction of the SGLD matrix begins by getting a pixel (m,n) 156 from the filtered image. A neighboring value for the pixel (m,n) is calculated using the algorithm in equation (1) If $|x(m,n+d)-x(m,n)|>|x(m+d,n)-x(m,n)|$ 158, then $y(m,n)=x(m,n+d)$ 160 Otherwise, $y(m,n)=x(m+d,n)$ 162 As is apparent, if pixel (m,n) is in a flat area where x(m,n) is equal to y(m,n), the entry [x(m,n), y(m,n)] is on the diagonal. On the other hand, if (m,n) is on an edge, the difference between x(m,n) and y(m,n) will be significant, and [x(m,n), y(m,n)] will be far away from the diagonal.

The entry [x(m,n), y(m,n)] in the SGLD matrix is then increased by one and the pixel counter (N) is increased by one Next, a check is made to determine if the calculation was for the last pixel 166 of the input image If so, SGLD matrix construction is complete and the SGLD matrix is ready for feature extraction 168 Otherwise, the next pixel is retrieved 156 from the input image.

For the matrix, the neighboring pixels in synthetic graphic images are expected to be either correlated or very different. In other words, for synthetic graphic images, SGLD matrix entries are usually either on the diagonal or far away from the diagonal This is because most pixels are either at the flat regions or on the edges On the other hand, pixels of natural pictures are not expected to have many abrupt changes Accordingly, masses are expected to be concentrated at the entries that are near the diagonal for natural picture images. This shows the noisy nature of the natural picture images.

Returning to FIG. 1, many features (e.g., variance, bias, skewness, fitness) can be extracted from the SGLD matrix to classify the input image between natural picture and synthetic graphic classes. The features can be implemented individually or combined in various methods (e.g., linear combination). Once the SGLD matrix is built, a feature or combination of features is selected for extraction 110 and processed using feature algorithms. For example, a first feature algorithm measures variance (V) (i e, the second-order moment around the diagonal) 112 and is defined as $$V=\Sigma_{|n-m|\Delta}s(m,n)(m-n)^2/N \qquad (2),$$

where s(m,n) is the (m,n)-th entry of the SGLD matrix, $\Delta$ is an integer parameter typically between 1 and 16 and;

$$N=\Sigma_{|n-m|>\Delta}s(m,n) \qquad (3)$$

As the summation is over all (m,n) such that $|m-n|>\Delta$, all the pixels in the flat regions are ignored. For synthetic graphic images, the remaining pixels are on the edges, while for natural picture images, both pixels in the noisy regions and pixels on the edges are included Variance (V) is typically larger for synthetic graphic images than for natural picture images The second feature algorithm measures average bias (B) 114 and is defined as:

$$B=\Sigma_{|n-m|>\Delta}s(m,n)[n-\mu(m)]^2/N \qquad (4),$$

where $\mu(m)$ is the mean of s(m,n) for a fixed m. For a given m, the distribution of s(m,n) is roughly symmetrical about the diagonal for natural picture images, as noise typically has a zero mean symmetrical distribution. As a result B is usually small for natural picture images. For synthetic graphic images, s(m,n) is usually unsymmetrical and B is large.

The third feature algorithm measures skewness (S) 116 and is defined as:

$$S = \text{skewness} = \sum_{n=0}^{GL-1} \frac{\left|\sum_{m=0}^{GL-1} |n-m|(n-m)s(m,n)\right|^{\frac{1}{2}}}{\sum_{m=0}^{GL-1} |n-m|s(m,n)} c(n)/C, \qquad (5)$$

-continued where:

$$c(n) = \sum_{m=0}^{GL-1} s(m, n) \text{ and } C = \sum_{n=0}^{GL-1} c(n). \quad (6)$$

The fourth feature algorithm measures fitness (F) 118 and is defined to be:

$$F = \text{fitness} = \frac{\sum_{n=0}^{GL-1}(n-m)^2 s(m, n)}{\sigma^2}, \quad (7)$$

where σ is defined such that $$\sum_{d=0}^{\sigma}[s(m, m+d) + s(m, m-d)] = 0.6 \times C \quad (8)$$

The image type decision 120 compares the result of the feature algorithm(s) to previously selected low and high thresholds (i.e., $T_L$ and $T_H$, respectively) depending on the algorithm(s) and combinations selected. If the result of the feature algorithm(s) is below the low threshold ($T_L$), the image is classified as a natural picture 122. If the result exceeds the high threshold ($T_H$), the classification is synthetic graphic 126. Obviously, if the behavior of a particular feature is converse to this logic, the decision logic can be easily reversed to accommodate. If the result of the feature algorithm(s) is equal to or between the low and high thresholds, the class of the image cannot be determined (i.e., indeterminate 124) from the feature or combination of features selected. It is understood that a number of other alternatives are possible For example, a result equal to a particular threshold can be said to be determinative of the image class, rather than indeterminate Also, in certain circumstances the low and high threshold can be equal.

Figure 3:
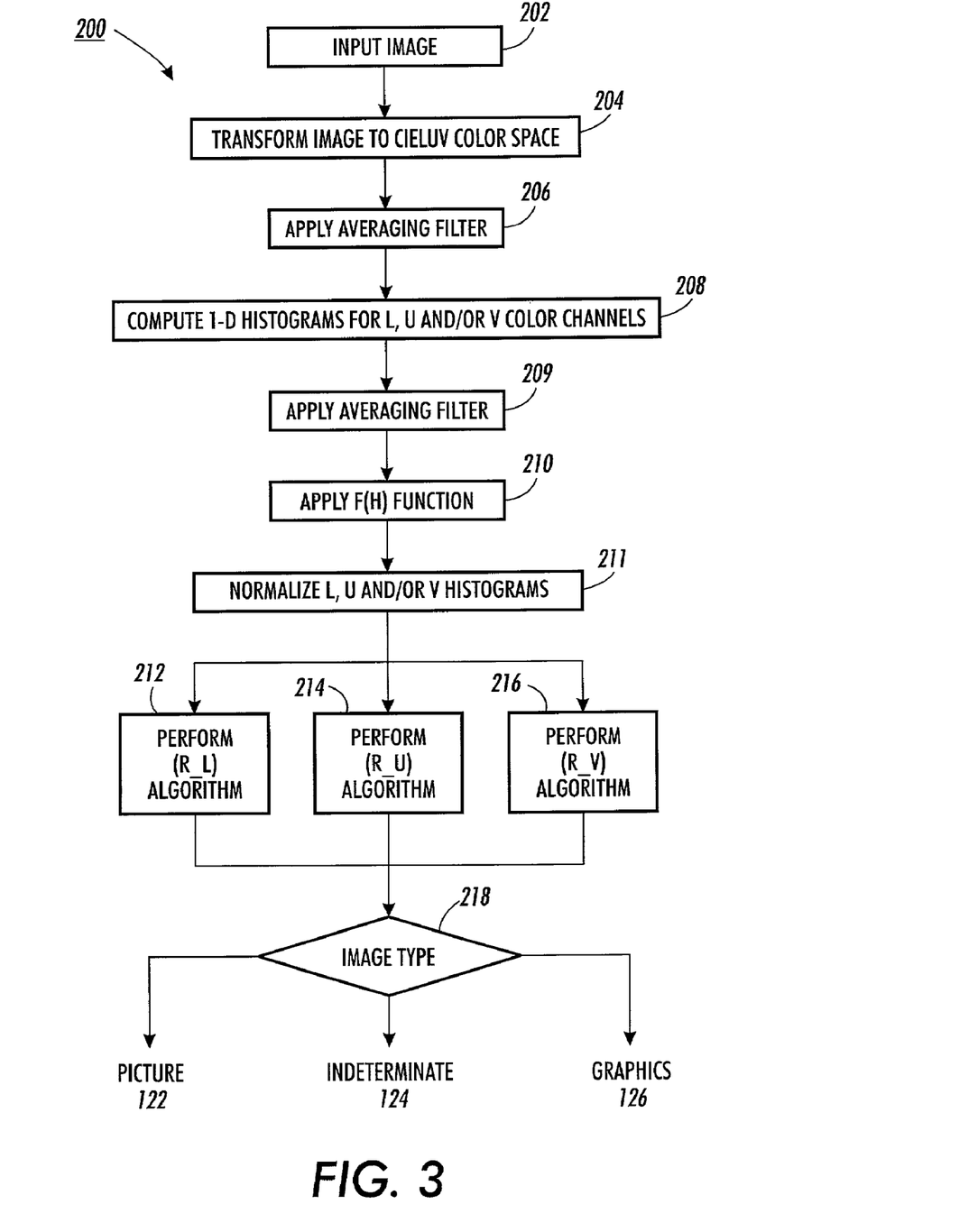
FIG. 3 is a flowchart of an image classification process using one-dimensional (1-D) color discreteness features in an embodiment of the invention.

With reference to FIG. 3, a flowchart of an image classification process 200 using 1-D color discreteness features in an embodiment of the invention is shown. The process 200 begins with an input image 202. First, the input image is transformed into a color space 204, in which the classification is performed Although CIELUV space is used in the embodiment being described, many other color spaces can also be used. Next, the image is smoothed using an averaging filter 206 to remove any noise due to halftones. For example, a 4×4 filter was used successfully Next, a 1-D color histogram is computed for a color channel (i.e., luminance (L), U, and V) 208, any combination of two 1-D color histograms may be computed, or all three 1-D color histograms may be computed, depending on the algorithm or combination of algorithms to be performed for classification.

Next, the histogram(s) may be pre-filtered using a low-pass filter, for example an averaging filter 209 to smooth out artificially boosted probabilities due to the size of the sample. The averaging filter, for example, works particularly well for images with a relatively small sample size that lead to a sparse distribution over the histogram Next, the histogram(s) may be pre-adjusted by applying an F(H) function to histogram entries with high bin counts representing large areas 210 in the image in the same color. Predetermined thresholds define high bin counts and determine whether or not the F(H) function is applied to the histogram bin. The F(H) function is a monotonically decreasing function (e.g., cube root) and under-weighs the histogram counts for the large areas. This under-weighing, for example, works particularly well to correct a bias to incorrectly classify pictures with large flat regions (e g, sky, paper background) as synthetic graphic images The L, U, and/or V histograms are normalized 211 by the number of pixels in the image. The color representation scheme is invariant under rotation and translation of the input image and the normalization provides scale invariance. If I(i) is the histogram of an image, where the index i represents a histogram bin, then the normalized histogram H is defined as follows:

$$H(i) = \frac{I(i)}{\sum_{i=0}^{GL-1} I(i)} \quad (9)$$

Since synthetic graphics are generated using a limited number of colors, synthetic graphic images usually are comprised of a few areas of uniform color Hence, the color histograms for a synthetic graphic image usually contain several sharp peaks. On the other hand, natural pictures usually contain more colors with smoothly varying transitions. Hence, natural pictures are more noisy and produce histograms containing fewer and smoother peaks. This difference in the histograms is captured in color discreteness algorithms for each color channel (i.e., R__L algorithm 212, R__U algorithm 214, and R__V algorithm 216). The color discreteness algorithms are defined as follows:

$$R\_L = \sum_{x=1}^{GL-1} |H\_L(x) - H\_L(x-1)|, \quad (10)$$

$$R\_U = \sum_{x=1}^{GL-1} |H\_U(x) - H\_U(x-1)|, \quad (11)$$

$$R\_V = \sum_{x=1}^{GL-1} |H\_V(x) - H\_V(x-1)|, \quad (12)$$

where GL is the number of bins in the H__L, H__U, and H__V color histograms The algorithms in equations (10)–(12) are derived from the 1-D color discreteness algorithm for any color space, defined for color channel s of a generic color space as follows.

$$R_s = \Sigma |H_s(x) - H_s(x-1)| \quad (13).$$

The image type decision 218 compares the results of the 1-D color discreteness algorithms (i.e., 212, 214, or 216) selected for performance to previously selected thresholds (e g, low threshold ($T_L$) and high threshold ($T_H$)) If the result of the selected 1-D color discreteness algorithm is above $T_H$ or below $T_L$, the image is classified as either a synthetic graphic 126 or natural picture 122 according to predetermined rules Otherwise, the class of the image cannot be determined (i.e., indeterminate 124) by the 1-D color discreteness feature (i.e., R__L, R__U, or R__V). Alternatively, the classifier may use all three 1-D color discreteness features in any sequence, any combination of two features in any sequence, or any one feature (as described above)

Figure 4:
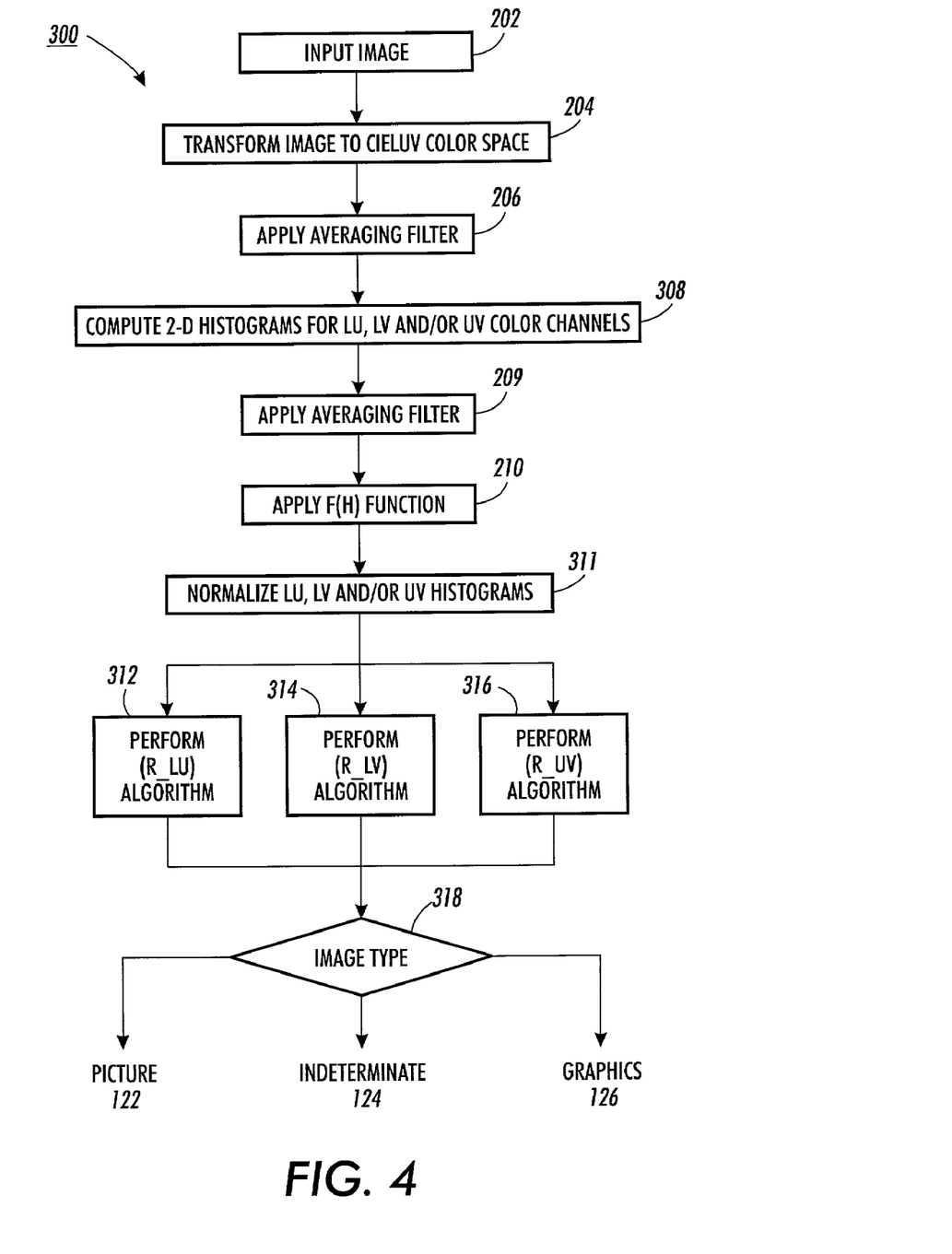
FIG. 4 is a flowchart of an image classification process using two-dimensional (2-D) color discreteness features in an embodiment of the invention.

With reference to FIG. 4, a flowchart of an image classification process 300 using 2-D color discreteness features in an embodiment of the invention is shown. Like the process 200 using 1-D color discreteness features, the process 300 begins with an input image 202, the input image is transformed into a color space 204, and the image is smoothed using an averaging filter 206 Again, although CIELUV space is used in the embodiment being described, many other color spaces can also be used Next, a 2-D color histogram is computed for two color channels (i.e., LU, LV, or UV) 308, any combination of two 2-D color histograms may be computed, or all three 2-D color histograms may be computed, depending on the algorithm or combination of algorithms to be performed for classification.

Next, like the process 200 using 1-D color discreteness features, the 2-D histogram(s) may be pre-filtered using an averaging filter 209 and may be pre-adjusted by applying an F(H) function to histogram entries representing large areas 210 Pre-filtering is important for the 2-D histogram(s), as they are typically sparse Next, the LU, LV, and/or UV histograms are normalized 311 by the number of pixels in the image using equation (9).

Next, like the process 200 using 1-D color discreteness features, the difference between histograms of natural picture images and synthetic graphic images is captured in 2-D color discreteness algorithms (i.e., R_LU algorithm 312, R_LV algorithm 314, and R_UV algorithm 316) The 2-D color discreteness algorithms for the LUV color space are defined as follows.

$$R\_LU = \sum_{x=1}^{GL-1} \sum_{y=1}^{GL-1} \left( \begin{array}{c} |H\_LU(x, y) - H\_LU(x-1, y)| + \\ |H\_LU(x, y) - H\_LU(x, y-1)| \end{array} \right), \quad (14)$$

$$R\_LV = \sum_{x=1}^{GL-1} \sum_{y=1}^{GL-1} \left( \begin{array}{c} |H\_LV(x, y) - H\_LV(x-1, y)| + \\ |H\_LV(x, y) - H\_LV(x, y-1)| \end{array} \right), \quad (15)$$

$$R\_UV = \sum_{x=1}^{GL-1} \sum_{y=1}^{GL-1} \left( \begin{array}{c} |H\_UV(x, y) - H\_UV(x-1, y)| + \\ |H\_UV(x, y) - H\_UV(x, y-1)| \end{array} \right), \quad (16)$$

where GL is the number of bins for each component in the H_LU, H_LV, and H_UV color histograms. The algorithms in equations (14)–(16) are derived from the 2-D color discreteness algorithm for any color space, defined for color channel s and color channel t of a generic color space as follows $$R_{st} = \Sigma(|H_{st}(x,y) - H_{st}(x-1,y)| + |H_{st}(x,y) - H_{st}(x,y-1)|) \quad (17)$$

The image type decision 318 compares the results of the 2-D color discreteness algorithm (i.e., 312, 314, or 316) selected for performance to previously selected thresholds (e.g., low threshold ($T_L$) and high threshold ($T_H$)). If the result of a 2-D color discreteness algorithm is above $T_H$ or below $T_L$, the image is classified as either a synthetic graphic 126 or natural picture 122 according to predetermined rules Otherwise, the class of the image cannot be determined (i.e., indeterminate 124) by the 2-D color discreteness feature (i.e., R_LU, R_LV, or R_UV). Alternatively, the classifier may use all three 2-D color discreteness features in any sequence, any combination of two features in any sequence, or any one feature (as described above).

Figure 5:
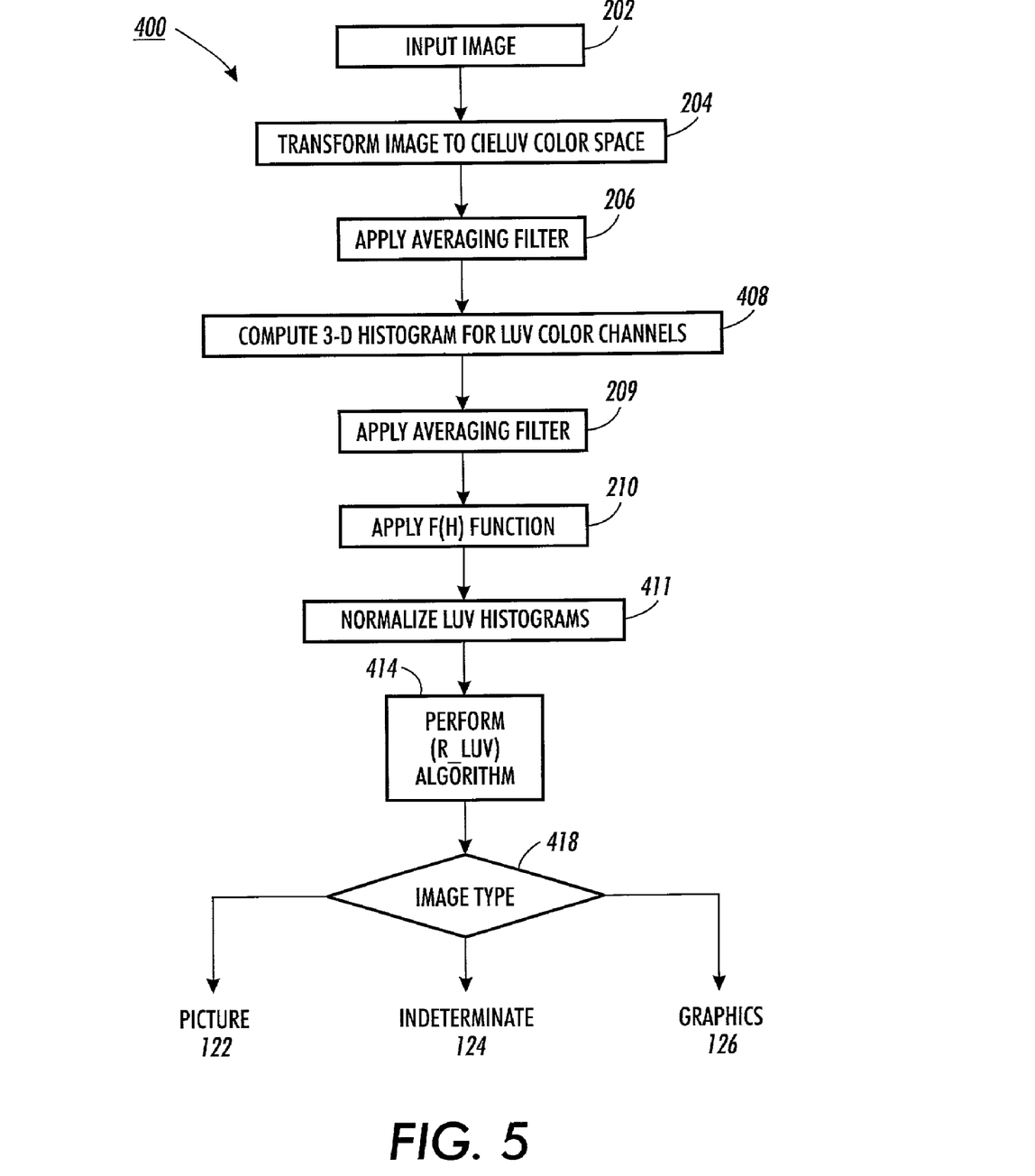
FIG. 5 is a flowchart of an image classification process using three-dimensional (3-D) color discreteness features in an embodiment of the invention.

With reference to FIG. 5, a flowchart of an image classification process 400 using 3-D color discreteness features in an embodiment of the invention is shown. Like the process 200 using 1-D color discreteness features and the process 300 using 2-D color discreteness features, the process 400 begins with an input image 202, the input image is transformed into a color space 204, and the image is smoothed using an averaging filter 206. Again, although CIELUV space is used in the embodiment being described, many other color spaces can also be used. Next, a 3-D color histogram is computed for the three color channels (i.e., LUV) 408.

Next, like the process 200 using 1-D color discreteness features and the process 300 using 2-D color discreteness features, the 3-D histogram may be pre-filtered using an averaging filter 209 and may be pre-adjusted by applying an F(H) function to histogram entries representing large areas 210. Pre-filtering is important for the 3-D histogram, as it is typically sparse. Next, the LUV histogram is normalized 411 by the number of pixels in the image using equation (9).

Next, like the process 200 using 1-D color discreteness features and the process 300 using 2-D color discreteness features, the difference between histograms of natural picture images and synthetic graphic images is captured in a 3-D color discreteness algorithm (i.e., R_LUV algorithm 414) The 3-D color discreteness algorithm is defined as follows:

$$R\_LUV = \sum_{x=1}^{GL-1} \sum_{y=1}^{GL-1} \sum_{z=1}^{GL-1} \left( \begin{array}{c} |H\_LUV(x, y, z) - H\_LUV(x-1, y, z)| + \\ |H\_LUV(x, y, z) - H\_LU(x, y-1, z)| + \\ |H\_LUV(x, y, z) - H\_LU(x, y, z-1)| \end{array} \right), \quad (18)$$

where GL is the number of bins for each component in the H_LUV color histogram. The algorithm in equation (18) is derived from the 3-D color discreteness algorithm for any color space, defined for a generic color space as follows $$R = \sum \left( \begin{array}{c} |H(x, y, z) - H(x-1, y, z)| + \\ |H(x, y, z) - H(x, y-1, z)| + \\ |H(x, y, z) - H(x, y, z-1)| \end{array} \right). \quad (19)$$

The image type decision 418 compares the results of the 3-D color discreteness algorithm (i.e., 414) to previously selected thresholds (e.g., low threshold ($T_L$) and high threshold ($T_H$)). If the result of a 3-D color discreteness algorithm is above $T_H$ or below $T_L$, the image is classified as either a synthetic graphic 126 or natural picture 122 according to predetermined rules Otherwise, the class of the image cannot be determined (i.e., indeterminate 124) by the 3-D color discreteness feature (i e, R_LUV).

Figure 6:
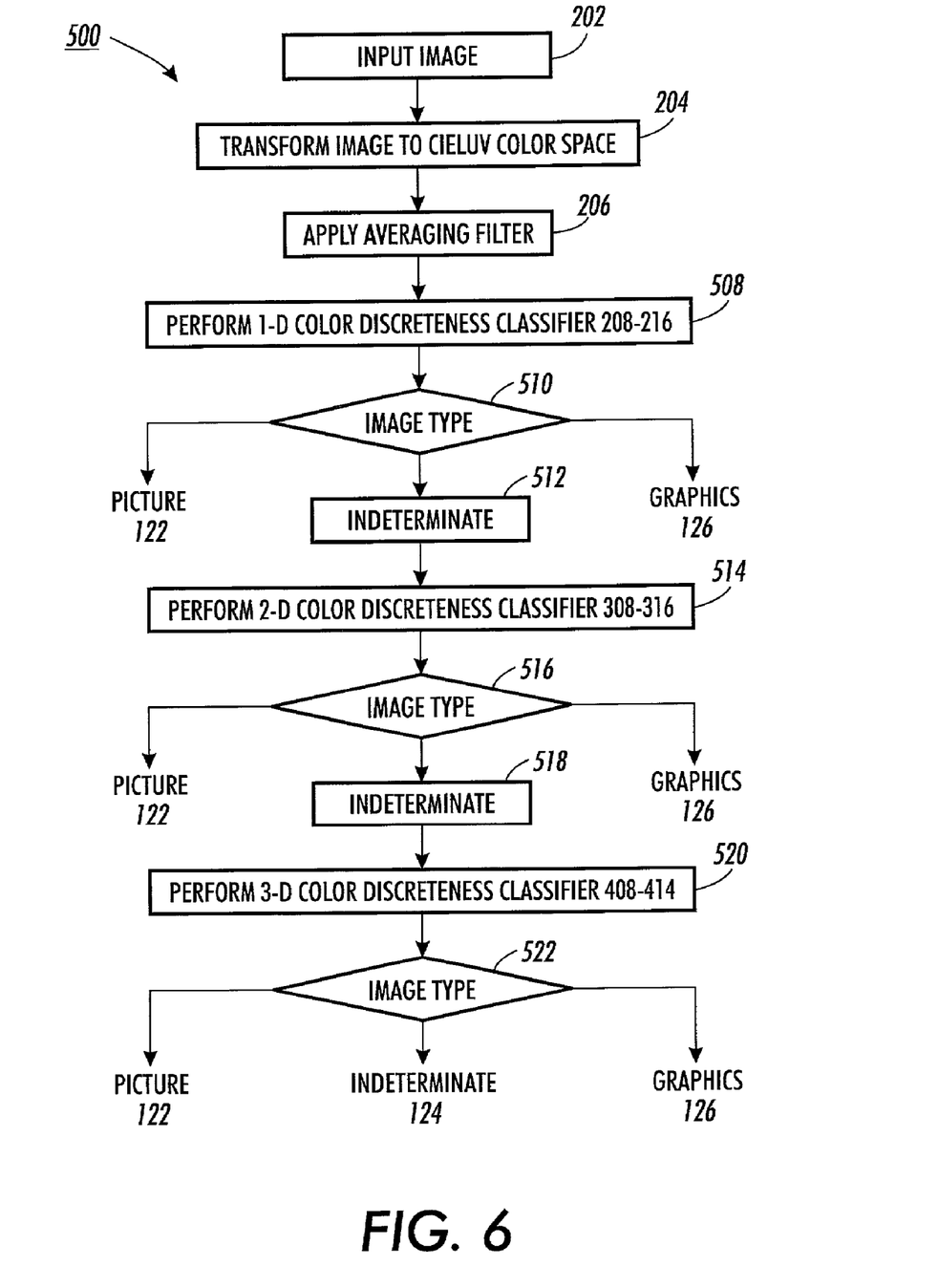
FIG. 6 is a flowchart of an image classification process using a combination of 1-D color discreteness features, 2-D color discreteness features, and 3-D color discreteness features in an embodiment of the invention.

With reference to FIG. 6, a flowchart of an image classification process 500 using a combination of 1-D color discreteness features, 2-D color discreteness features, and 3-D color discreteness features in an embodiment of the invention is shown Notably, this color discreteness combination classifier includes features of the three classifiers using 1-D color discreteness features, 2-D color discreteness features, and 3-D color discreteness features discussed above By combining the three color discreteness classifiers, performance may be improved over an individual color discreteness classifier. The color discreteness combination classifier can take advantage of reduced processing overhead by making an early classification, for example, using the 1-D color discreteness features where the classification is more obvious Conversely, the color discreteness combination classifier can take advantage of increased precision by continuing to analyze the statistics of the input image using 2-D color discreteness features and 3-D color discreteness features.

Like the individual processes 200, 300, 400, the process 500 begins with an input image 202, the input image is transformed into a color space 204, and the image is smoothed using an averaging filter 206. Again, although CIELUV space is used in the embodiment being described, many other color spaces can also be used The process 500 continues by performing steps 208 through 216 of the 1-D color discreteness classifier 508 shown in FIG. 3 The image type decision 510 compares the results of the 1-D color discreteness algorithms (i.e., 212, 214, or 216) selected for performance to previously selected thresholds (e.g., low threshold ($T_L$) and high threshold ($T_H$)). If the result of the selected 1-D color discreteness algorithm is above $T_H$ or below $T_L$, the image is classified as either a synthetic graphic 126 or natural picture 122 according to predetermined rules Otherwise, the class of the image cannot be determined (i e., indeterminate 512) by the 1-D color discreteness feature (i e, R_L, R_U, or R_V). Alternatively, the 1-D color discreteness classifier may use all three 1-D color discreteness features in any sequence, any combination of two features in any sequence, or any one feature during step 508

If the result of the 1-D color discreteness classifier is indeterminate 512, the process 500 continues by performing steps 308 through 316 of the 2-D color discreteness classifier 514 shown in FIG. 4 The image type decision 516 compares the results of the 2-D color discreteness algorithms (i.e., 312, 314, or 316) selected for performance to previously selected thresholds (e.g., low threshold ($T_L$) and high threshold ($T_H$)). If the result of a 2-D color discreteness algorithm is above $T_H$ or below $T_L$, the image is classified as either a synthetic graphic 126 or natural picture 122 according to predetermined rules. Otherwise, the class of the image cannot be determined (i e, indeterminate 518) by the 2-D color discreteness feature (i e, R_LU, R_LV, or R_UV). Alternatively, the 2-D color discreteness classifier may use all three 2-D color discreteness features in any sequence, any combination of two features in any sequence, or any one feature during step 514

If the result of the 2-D color discreteness classifier is indeterminate 518, the process 500 continues by performing steps 408 through 414 of the 3-D color discreteness classifier 520 shown in FIG. 5. The image type decision 522 compares the results of the 3-D color discreteness algorithm (i.e., 414) to previously selected thresholds (e.g., low threshold ($T_L$) and high threshold ($T_H$)) If the result of a 3-D color discreteness algorithm is above $T_H$ or below $T_L$, the image is classified as either a synthetic graphic 126 or natural picture 122 according to predetermined rules. Otherwise, the class of the image cannot be determined (i.e., indeterminate 124) by the 3-D color discreteness feature (i.e, R_LUV).

Alternatively, the color discreteness combination classifier may perform the 1-D color discreteness classifier, the 2-D color discreteness classifier, and 3-D color discreteness classifier in any sequence and may perform all three color discreteness classifiers or any two color discreteness classifiers before making an image type decision.

Figure 7:
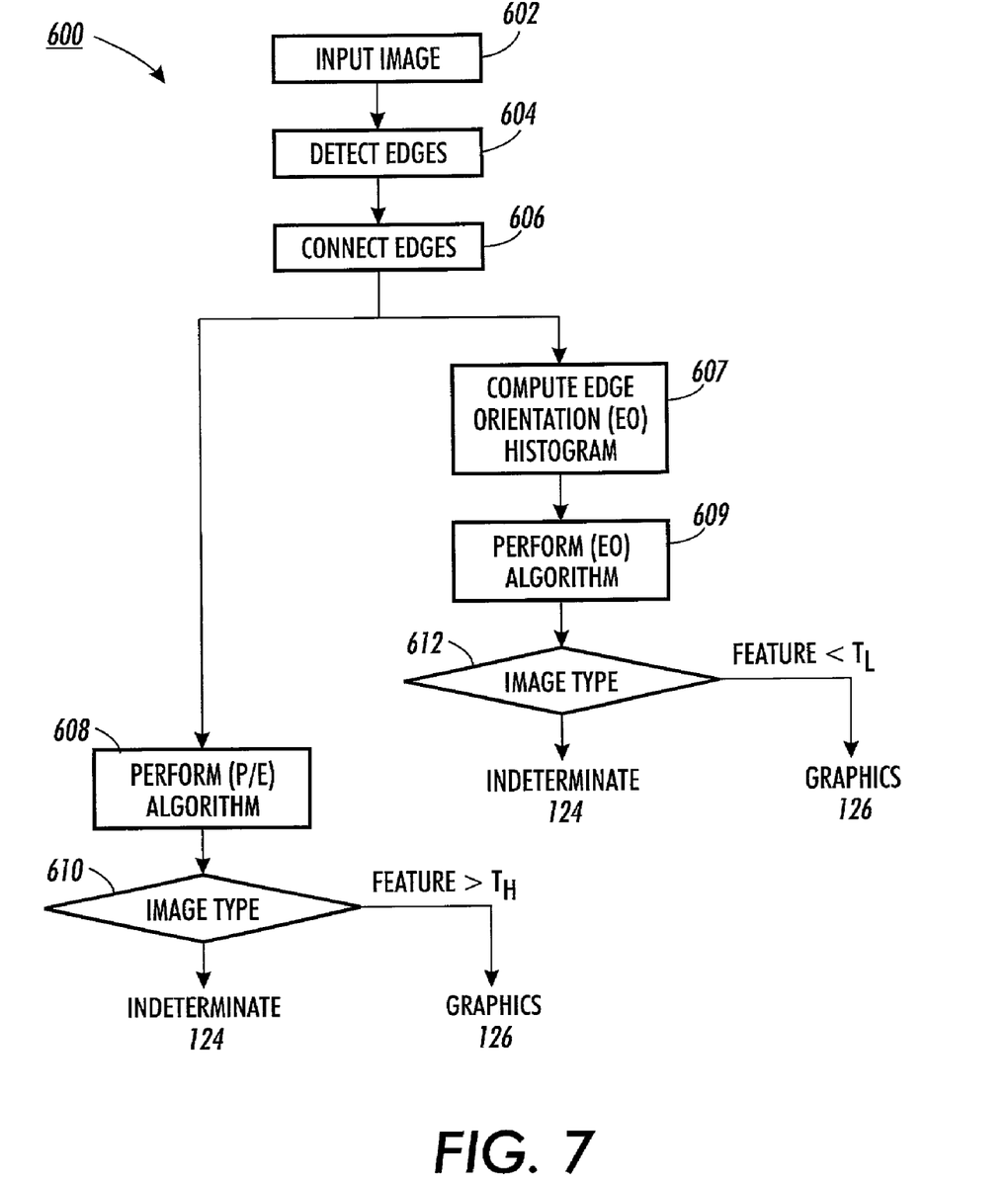
FIG. 7 is a flowchart of an image classification process using edge features in an embodiment of the invention.

With reference to FIG. 7, a flowchart of an image classification process 600 using edge features in an embodiment of the invention is shown. The process 600 begins with an input image 602. First, edges of color areas in the image are detected 604 using a standard Canny edge detector and an edge map image is created. The parameters identified for the edge detector were determined empirically. Deviations that produce suitable results are also contemplated. Next, the edges in the edge map image are connected 606 (e.g., using a standard 8-connected component algorithm) The average number of pixels per connected edge (P/E) in the edge map image is used as a feature 608 The algorithm for this edge feature is defined as $$P/E = \frac{\text{No. of Edge Pixels}}{\text{No. of Connected Edges}}. \tag{20}$$

Typically, synthetic graphic images have fewer connected edges, but each connected edge includes a large number of pixels. On the other hand, pictures have a lot more connected edges, but usually very few pixels in each connected edge This feature is particularly accurate for high values. In other words, if the value of P/E is high, it is almost certain that the image is synthetic graphic image However, if the value of P/E is low, the classification of the image is less certain (e.g, indeterminate) This is because the P/E value may be low for synthetic graphic images that have low frequency halftones or certain types of backgrounds. Accordingly, the image type decision 610 compares the result of the P/E feature algorithm to a previously selected high threshold (i e., $T_H$) If the result exceeds the high threshold ($T_H$), the classification is synthetic graphic 126 Otherwise, the class of the image cannot be determined (i e, indeterminate 124).

The orientation of edges (EO) in the edge map image is also used as a feature 609. As shown in FIG. 7, the connected edges 606 in the edge map image are used to compute an edge orientation histogram 607. For example, the Hough Transform may be used to compute the edge orientation histogram The Hough Transform is a well-known method for finding lines. A detailed description of the Hough Transform can be found in "Digital Picture Processing", by Azriel Rosenfeld and Avinash C. Kak, (Academic Press, Inc, 1982) Vol. 2, pp 121–126. The Hough Transform converts an edge map image into a 2-D histogram with one dimension being the line orientation and the other being the line intercept A Hough Transform entry HT (x,y) represents the length of a line that has an orientation of x and an intercept of y. The edge orientation histogram H(x) 607 can be obtained by manipulating the HT (x,y) histogram as follows:

$$H(x)=(\Sigma HT(x,y)^2)^{1/2} \tag{21},$$

where the summation is over all y values.

The edge orientation (EO) algorithm 609 is performed on the edge orientation histogram H(x) 607 as follows.

$$EO=-\Sigma H(x) \log H(x) \tag{22}$$

It has been observed that synthetic graphic images often contain many long straight edges that are oriented in the same direction, typically horizontal and vertical directions, while the edges in natural picture images are typically shorter and oriented more randomly. If many of the edge pixels have a common orientation, the resulting histogram will show one or more spikes. The result of the edge orientation algorithm (i.e., entropy measure) for a spiky histogram is a low number Accordingly, the image type decision 612 compares the result of the EO feature algorithm 609 to a previously selected low threshold (i.e., $T_L$). If the result is less than the low threshold ($T_L$), the classification is synthetic graphic 126. Otherwise, the class of the image cannot be determined (i.e., indeterminate 124).

Furthermore, it is understood that additional edge features may be used for classification of images between natural picture and synthetic graphic classes Any combination of edge features can also be used by the classifier in any sequence.

Figure 8:
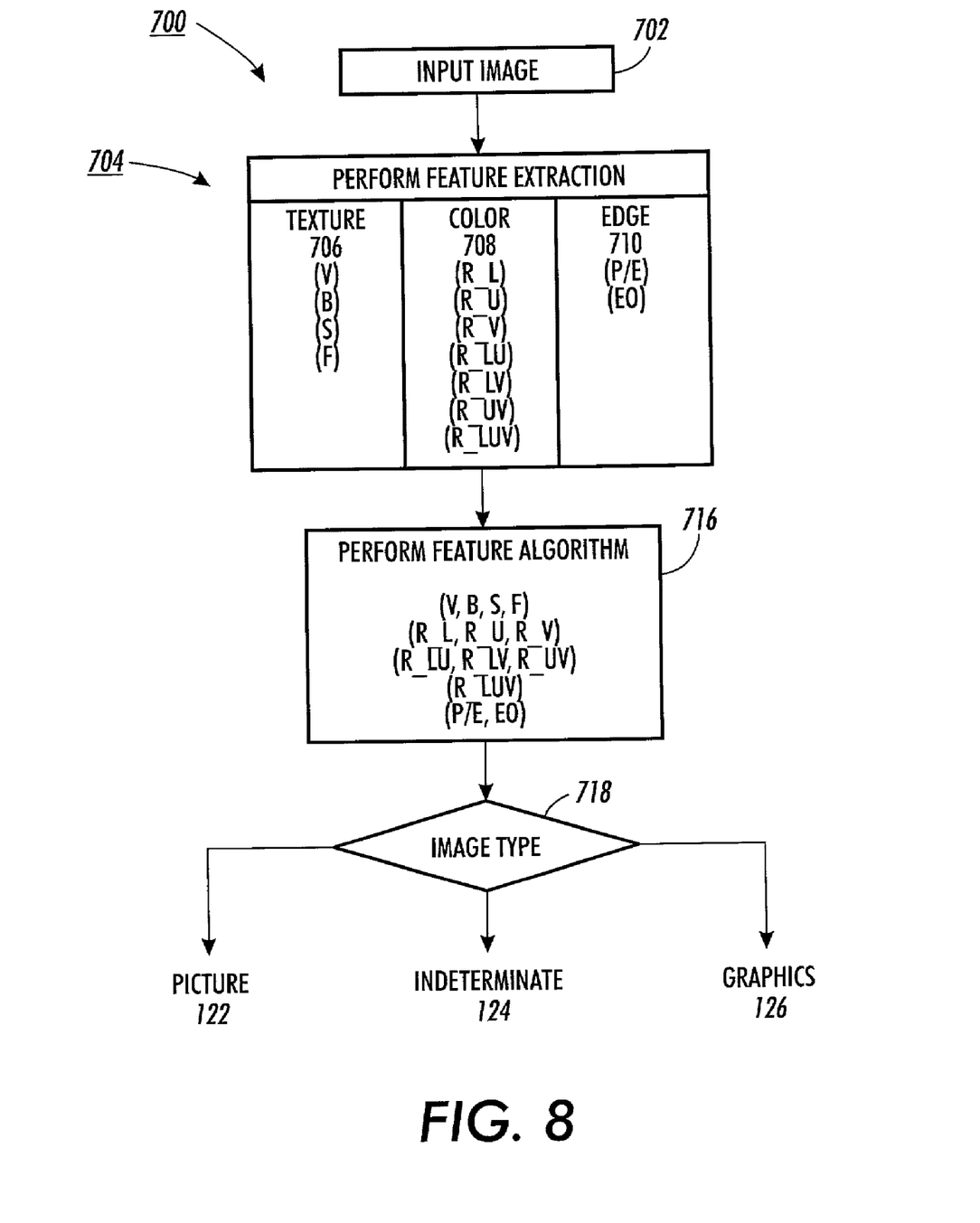
FIG. 8 is a flowchart of an image classification process using a combination of SGLD texture features, color discreteness features, and edge features in an embodiment of the invention; and, FIG. 9 is a block diagram of an image processing system using a "binary" image classification process (i e., classification of images between natural picture or synthetic graphic classes).

With reference to FIG. 8, a flowchart of an image classification process 700 using a combination of SGLD texture features, color discreteness features, and edge features in an embodiment of the invention is shown Notably, this image classifier combines all the features of the three types of classifiers discussed above, including 1-D, 2-D, and 3-D features in regard to color discreteness By combining SGLD texture, color discreteness, and/or edge features in one classifier, performance may be improved over classifiers using a single feature.

The process 700 begins with an input image 702. Next, the features are extracted from the input image 704. Feature extraction includes compiling SGLD texture features 706 (e.g., variance (V), bias (B), skewness (S), fitness (F)), color discreteness features 708, including 1-D color discreteness features, (e g, R_L, R_U, R_V), 2-D color discreteness features, (e.g., R_LU, R_LV, R_UV), and 3-D color discreteness features, (e.g., R_LUV), and edge features 710 (e.g., P/E, EO).

The SGLD texture features are extracted by performing steps 104–110 of the process 100 depicted in FIG. 1. Similarly, the 1-D color discreteness features are extracted by performing steps 204–211 of the process 200 depicted in FIG. 3 Likewise, the 2-D color discreteness features are extracted by performing steps 204–311 of the process 300 depicted in FIG. 4. Similarly, the 3-D color discreteness features are extracted by performing steps 204–411 of the process 400 depicted in FIG. 5 Likewise, the edge features are extracted by performing steps 604–607 of process 600 depicted in FIG. 7.

Next, the feature algorithms are performed 716 The SGLD texture feature algorithms are performed by accomplishing steps 112–118 of the process 100 depicted in FIG. 1 Similarly, the 1-D color discreteness feature algorithms are performed by accomplishing steps 212–216 of the process 200 depicted in FIG. 3 Likewise, the 2-D color discreteness feature algorithms are performed by accomplishing steps 312–316 of the process 300 depicted in FIG. 4. Similarly, the 3-D color discreteness feature algorithm is performed by accomplishing step 414 of the process 400 depicted in FIG. 5. Likewise, the edge feature algorithms are performed by accomplishing steps 608 and 609 of the process 600 depicted in FIG. 7.

Finally, the image type decision 718 compares the results of the feature algorithms (e.g., V, B, S, F, R_L, R_U, R_V, R_LU, R_LV, R_UV, R_LUV, P/E, EO) to previously selected thresholds (e.g., low thresholds ($T_L$) and/or high thresholds ($T_H$)) associated with each feature. If the result of any feature algorithm is above the associated $T_H$ or below the associated $T_L$, the image is classified as either a synthetic graphic 126 or natural picture 122 according to predetermined rules Otherwise, the class of the image cannot be determined (i.e., indeterminate 124) by the combination classifier. The combination classifier may also incorporate logic to resolve conflicting results, particularly where one individual classifier is indeterminate 124 and another individual classifier classifies the image as either a synthetic graphic 126 or natural picture 122.

The embodiment described and shown in FIG. 8 uses all features available to the combination classifier and performs feature extraction 704 in a parallel fashion, performs feature algorithms 716 in a parallel fashion, and then makes a combination image type decision 718. Alternatively, the combination classifier may use all features available to it in any sequence. In other words, feature extraction 704, feature algorithms 716, and image type decisions 718 can be performed for individual features, in a serial fashion, similar to that described above for the color discreteness combination classifier shown in FIG. 6. Further alternatives, using a serial-parallel combination in any order with any combination of any two or more features in parallel legs of such a combination classifier are also contemplated. Many other alternative combination classifiers are also available by using any combination of two or more of the features available to the combination classifier in parallel fashion, serial fashion, or serial-parallel fashion.

Figure 9:
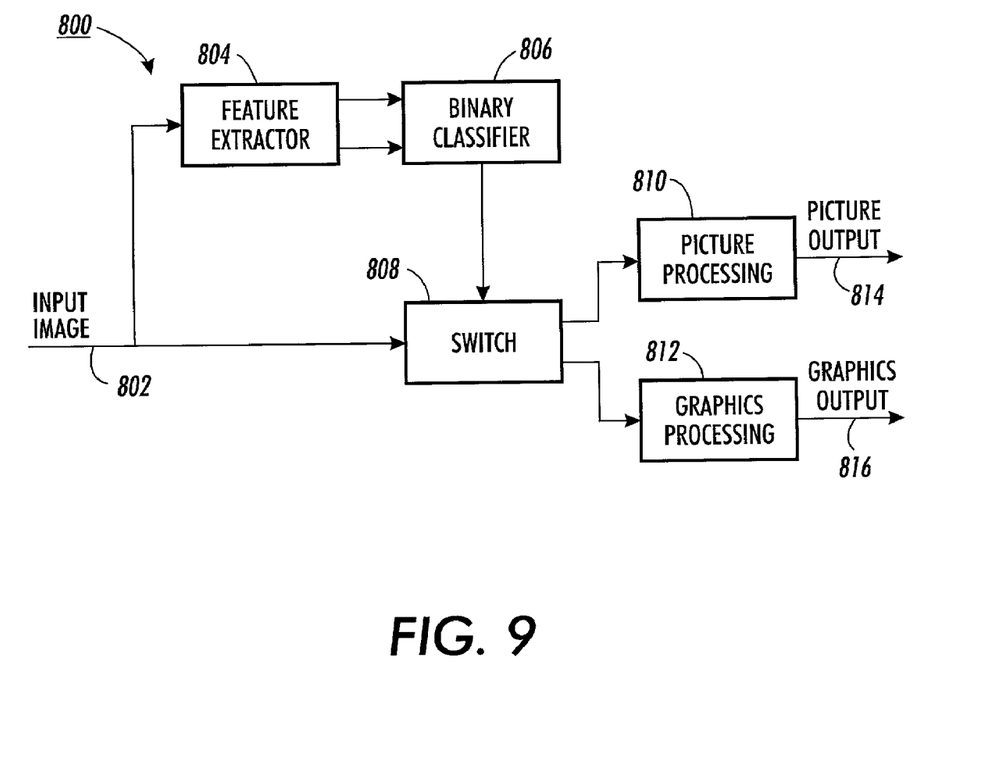

With reference to FIG. 9, a block diagram of an image segmentation system 800 using a "binary" image classification process (i e, classification of images between natural picture or synthetic graphic classes) is shown The picture/graphic classifiers (i.e., 100, 200, 300, 400, 500, 600, 700) of FIGS. 1–8 are "binary" classifiers and could be implemented in such a system 800. As described above for FIGS. 1–8, an input image 802 is provided to a feature extractor 804. The feature extractor 804 extracts pertinent characteristics (i.e., features) based on the parameters required by algorithms of the binary classifier 806 The binary classifier 806 exercises algorithms designed to classify the input image between a natural picture or a synthetic graphic image (e.g., [0, 1] where 0 indicates natural picture and 1 indicates synthetic graphic). This binary classification result is provided to a switch 808. The switch 808 receives the input image 802 and switches it between natural picture processing 810 and synthetic graphic processing 812, depending on the binary classification result Natural picture processing 810 processes the image in a manner tailored to maximize the quality of natural picture images (e g., gamut mapping) Similarly, synthetic graphic processing 812 is tailored to maximizes the quality of synthetic graphic images (e.g., filtering). If the input image is classified as a picture, the input image 802 is switched to natural picture processing 810 and a picture output 814 is produced. Alternatively, if the image is classified as a synthetic graphic, the input image 802 is switched to synthetic graphic processing 812 and a synthetic graphic output 816 is produced. In the event that the binary classifier 806 cannot determine the class of the input image, one of the processes (e.g., natural picture processing 810) may be selected by default.

The invention has been described above with reference to various embodiments. Obviously, modifications and alterations will occur to others upon reading and understanding the preceding detailed description It is intended that the invention be construed as including all such modifications and alterations insofar as they come within the scope of the appended claims or the equivalents thereof.

Having thus described the various embodiments of the invention, the invention is now claimed to be:

1. A method for classification of an input image in picture or graphic classes, comprising the following steps:
   a) extracting an edge orientation feature from the input image;
   b) processing the edge orientation feature using an algorithm associated with the feature, the algorithm is $-\Sigma H(x) \log H(x)$, where H(x) is an edge orientation histogram;
   c) comparing the result of the feature algorithm to one or more previously selected thresholds; and
   d) if, according to previously determined rules, any comparison is determinative of the class of the input image, classifying the input image in either the picture or graphic classes according to the previously determined rules, otherwise indicating the result is indeterminate.

2. The method as set forth in claim 1, wherein step a) includes the following steps:
   e) processing the input image to detect edges;
   f) creating an edge map image showing the detected edges;
   g) processing the edge map image to connect the detected edges; and
   h) computing a histogram from the edge map image based on orientation of the detected edges.

3. The method as set forth in claim 2, wherein step h) includes the following steps:
   i) computing a two-dimensional histogram from the edge map image using the Hough transform; and,
   j) processing the two-dimensional histogram using the equation $$H(x)=(\Sigma HT(x,y)^2)^{1/2},$$

wherein H(x) is an edge orientation histogram. HT(x, y) is a Hough Transform histogram that represents a length of a line, x is a line orientation, y is a line intercept, and the summation is for all y values.

4. A method for classification of an input image in picture or graphic classes using a combination classifier, comprising the following steps:
   a) performing a combination picture/graphics classifier on an input image using two or more features selected from the group consisting of edge features, SGLD texture features, one-dimensional color discreteness features, two-dimensional color discreteness features, and a three-dimensional color discreteness feature represented by:

$$\Sigma(|H(x,y,z)-H(x-1,y,z)|+|H(x,y,z)-H(x,y-1,z)|+|H(x,y,z)-H(x,y,z-1)|),$$

where H( ) is a 3-D color histogram and x, y and z are bin numbers; and,
   b) comparing the results of the combination picture/graphics classifier for each feature selected for performance and, if one or more of the selected features is determinative of the class of the input image, classifying the input image in either the picture or graphic classes according to previously determined rules, otherwise indicating the result is indeterminate.

5. The method as set forth in claim 4, wherein the edge features in a) include at least one of an average number of pixels per connected edge feature (P/E) and an edge orientation feature (EO).

6. The method as set forth in claim 4, wherein the two-dimensional color discreteness features in a) include one or more of three two-dimensional color histograms, each two-dimensional color histogram representing two color channels of a predetermined color space comprised of three color channels, wherein the three two-dimensional color histograms represent the possible combinations of two color channels.

7. The method as set forth in claim 6, wherein each two-dimensional color discreteness algorithm is represented by the algorithm:

$$\Sigma(|H_{st}(x,y)-H_{st}(x-1,y)|+|H_{st}(x,y)-H_{st}(x,y-1)|),$$

where $H_{st}$ is a 2-D color histogram, x and y indicate respective bin numbers, s and t are the two color channels of the color space represented in the two-dimensional color discreteness algorithm.

8. The method as set forth in claim 4, wherein the three-dimensional color discreteness feature in a) represents three color channels of a predetermined color space comprised of three color channels.

9. A method for classification of an input image in picture or graphic classes using a combination classifier, comprising the following steps:
   a) performing a picture/graphics classifier on an input image using one or more edge features;
   b) if the result of the picture/graphics classifier using edge features is indeterminate, performing a picture/graphics classifier on the input image using one or more one-dimensional color discreteness features;
   c) if the result of the picture/graphics classifier using one-dimensional color discreteness features is indeterminate, performing a picture/graphics classifier on the input image using SGLD texture features;
   d) if the result of the picture/graphics classifier using SGLD texture features is indeterminate, performing a picture/graphics classifier on the input image using one or more two-dimensional color discreteness features represented by the algorithm:

$$\Sigma(|H_{st}(x,y)-H_{st}(x-1,y)|+|H_{st}(x,y)-H_{st}(x,y-1)|),$$

where $H_{st}$ is a 2-D color histogram, x and y indicate respective bin numbers, s and t are the two color channels of the color space represented in the two-dimensional color discreteness feature; and,
   e) if the result of the picture/graphics classifier using two-dimensional color discreteness features is indeterminate, performing a picture/graphics classifier on the input image using a three-dimensional color discreteness feature.

10. The method as set forth in claim 9, wherein the edge features in a) include at least one of an average number of pixels per connected edge feature (P/E) and an edge orientation feature (EO).

11. The method as set forth in claim 9, wherein the two-dimensional color discreteness features in d) include one or more of three two-dimensional color histograms, each two-dimensional color histogram representing two color channels of a predetermined color space comprised of three color channels, wherein the three two-dimensional color histograms represent the possible combinations of two color channels.

12. The method as set forth in claim 9, wherein the three-dimensional color discreteness feature in e) represents three color channels of a predetermined color space comprised of three color channels, wherein the three-dimensional color discreteness feature is represented by the algorithm:

$$\Sigma(|H(x,y,z)-H(x-1,y,z)|+|H(x,y,z)-H(x,y-1,z)|+|H(x,y,z)-H(x,y,z-1)|),$$

where H( ) is a 3-D color histogram, and x, y and z indicate respective bin numbers.

13. A method for classification of an input image in picture or graphic classes using a combination classifier, comprising the following steps:
   a) performing a picture/graphics classifier on an input image using one or more edge features;
   b) performing a picture/graphics classifier on the input image using one or more one-dimensional color discreteness features;
   c) performing a picture/graphics classifier on the input image using one or more SGLD texture features;

d) performing a picture/graphics classifier on the input image using one or more two-dimensional color discreteness features that are processed by an algorithm that includes summing the differences between 2-D color histograms, which represent two color channels, over respective bins;

e) performing a picture/graphics classifier on the input image using a three-dimensional color discreteness feature features that are processed by an algorithm that includes summing the differences between 3-D color histograms, which represent three color channels, over respective bins; and, f) comparing the results of each picture/graphics classifier performed and, if one or more classifiers is determinative of the class of the input image, classifying the input image in either the picture or graphic classes according to previously determined rules, otherwise indicating the result is indeterminate.

14. A image processing system for producing an output image associated with an input image based on classification of the input image, comprising:

a feature extractor for extracting one or more features from the input image, wherein the two or more features are selected from the group consisting of edge features, SGLD texture features, one-dimensional color discreteness features, two-dimensional color discreteness features, and a three-dimensional color discreteness feature;

a binary classifier for classifying the input image in picture or graphic classes using the one or more extracted features, the binary classifier processes the two-dimensional color discreteness feature using a summation of the differences between 2-D color histograms, representing two color channels, over respective bins;

a picture processing module for processing the input image using picture image processing functions;

a graphic processing module for processing the input image using graphic image processing functions; and, a switch for routing the input image for image processing by the picture processing module or the graphic processing module based on the classification of the input image by the binary classifier between picture and graphic classes.

15. The image processing system as set forth in claim 14, wherein the edge features extracted by the feature extractor include at least one of an average number of pixels per connected edge feature (P/E) and an edge orientation feature (EO).

16. The image processing system as set forth in claim 14, wherein the two-dimensional color discreteness features extracted by the feature extractor include one or more of three two-dimensional color discreteness features, each two-dimensional color discreteness feature representing two color channels of a predetermined color space comprised of three color channels, wherein the three two-dimensional color discreteness features represent the possible combinations of two color channels.

17. The image processing system as set forth in claim 16, the binary classifier further including a process for processing each two-dimensional color discreteness features using the algorithm:

$$\Sigma(|H_{st}(x,y)-H_{st}(x-1,y)|+|H_{st}(x,y)-H_{st}(x,y-1)|),$$

where $H_{st}$ is a 2-D color histogram, x and y indicate respective bin numbers, s and t are the two color channels of the color space represented in the two-dimensional color discreteness feature.

18. The image processing system as set forth in claim 14, wherein the three-dimensional color discreteness feature extracted by the feature extractor represents three color channels of a predetermined color space comprised of three color channels, the binary classifier further including a process for processing the three-dimensional color discreteness feature using the algorithm:

$$\Sigma(|H(x,y,z)-H(x-1,y,z)|+|H(x,y,z)-H(x,y-1,z)|+|H(x,y,z)-H(x,y,z-1)|),$$

where H( ) is a 3-D color histogram and x, y, and z are bin numbers.

19. The method as set forth in claim 13, the algorithm for processing the one or more two-dimensional color discreteness feature is the following:

$$\Sigma(|H_{st}(x,y)-H_{st}(x-1,y)|+|H_{st}(x,y)-H_{st}(x,y-1)|),$$

where $H_{st}$ is a 2-D color histogram, x and y indicate respective bin numbers, s and t are the two color channels of the color space represented in the two-dimensional color discreteness feature.

20. The method as set forth in claim 13, the algorithm for processing the one or more three-dimensional color discreteness feature is the following:

$$\Sigma(|H(x,y,z)-H(x-1,y,z)|+|H(x,y,z)-H(x,y-1,z)|+|H(x,y,z)-H(x,y,z-1)|),$$

where H( ) is a 3-D color histogram and x, y, and z are bin numbers.

* * * * *